No. 638,312. Patented Dec. 5, 1899.
J. A. BECHER.
DUPLEX CHUCKING LATHE.
(Application filed Aug. 11, 1899.)
(No Model.)
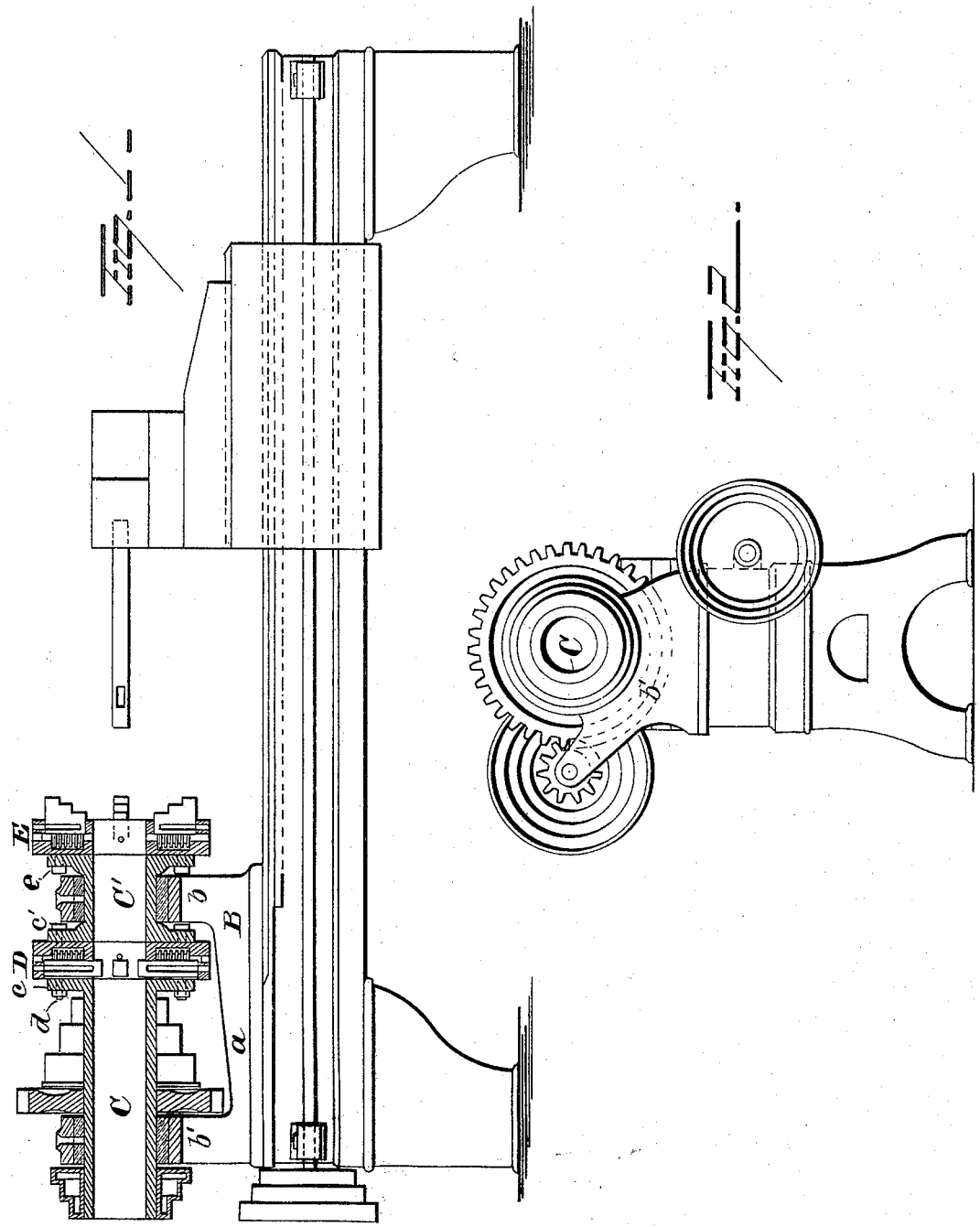
WITNESSES
E. J. Nottingham
G. F. Downing
INVENTOR
J. A. Becher
By H. A. Seymour
Attorney

UNITED STATES PATENT OFFICE.

JAMES A. BECHER, OF MISHAWAKA, INDIANA.

DUPLEX CHUCKING-LATHE.

SPECIFICATION forming part of Letters Patent No. 638,312, dated December 5, 1899.

Application filed August 11, 1899. Serial No. 726,890. (No model.)

*To all whom it may concern:*

Be it known that I, JAMES A. BECHER, of Mishawaka, in the county of St. Joseph and State of Indiana, have invented certain new and useful Improvements in Duplex Chucking-Lathes; and I do hereby declare the following to be a full, clear, and exact description of the invention, such as will enable others skilled in the art to which it appertains to make and use the same.

My invention relates to an improvement in lathes, the object of the same being to provide means for more securely holding the work in place; and it consists in a hollow arbor supported at two or more points throughout its length and provided with two chucks, the chucks being separated by one of the arbor-supporting bearings.

My invention further consists in certain details of construction and combinations of parts, as will be more fully hereinafter described, and pointed out in the claim.

In the accompanying drawings, Figure 1 is a view in side elevation, partly in section, of a lathe embodying my invention; and Fig. 2 is a view in end elevation of the same.

A represents the bed of the machine, and B the head thereof. This head comprises a base $a$ and two bearings $b\ b'$, in which latter are mounted the sectional hollow arbors C C'. The rear section C of the hollow arbor is mounted in the bearing $b'$ and is connected at its flanged front end with the chuck D, while the section C' of the arbor is supported in the bearing $b$ and is secured at its rear flanged end to the chuck D and flange $c$ of the section C of the arbor by bolts $c'$ and is connected at its flanged front end to the chuck E by bolts $d$. These chucks, which may be of any approved form, are thus located on opposite sides of the bearing $b$, and the two chucks are located sufficiently far apart to solidly support and sustain long sleeves or cylinders. With this construction the cylinder or sleeve to be turned or bored is solidly supported at two widely-separated points, and as the arbor is supported between the chucks and also at a point outside of the rear chuck it will be seen that there is no possibility of the work slipping after it has been once centered in the arbor.

While I have shown the gearing for actuating the arbor and the feed-screw, I do not wish to confine myself to it nor to any particular mechanism, as my invention resides solely in the hollow arbor carrying a plurality of chucks, one of the chucks being located between the arbor-supporting bearings.

It is evident that changes in the form and construction of the arbor and chucks might be resorted to without departing from the spirit and scope of my invention, and hence would have it understood that I do not confine myself to the details herein shown and described, but consider myself at liberty to make such changes as fairly fall within the spirit and scope of my invention.

Having fully described my invention, what I claim as new, and desire to secure by Letters Patent, is—

The combination with a head and bearings at the respective ends of said head, of a hollow arbor made in two sections, mounted in said bearings, one of said sections having a flange at each end and the other section having a flange at one end, a chuck disposed between said bearings and between the two sections of the arbor, fastening devices passing through a flange of each section of the arbor and through said chuck and another chuck secured to the other flange of the section of the arbor having two flanges.

In testimony whereof I have signed this specification in the presence of two subscribing witnesses.

JAMES A. BECHER.

Witnesses:
JONATHAN W. ZIGLER,
GRACE E. MCMICHAEL.